July 28, 1959

B. D. BERKOWITZ 2,897,458

SHUTTER FOR WAVEGUIDES

Filed Oct. 16, 1957

Inventor
Bernard D. Berkowitz
by Roberts Cushman + Grover
Attys.

United States Patent Office 2,897,458
Patented July 28, 1959

2,897,458

SHUTTER FOR WAVEGUIDES

Bernard D. Berkowitz, Waltham, Mass., assignor to Microwave Associates, Inc., Burlington, Mass., a corporation of Massachusetts Application October 16, 1957, Serial No. 690,517

3 Claims. (Cl. 333—13)

The field of the present invention is that of control apparatus for ultrahigh frequency electromagnetic wave systems and more particularly that of devices for attenuating signals in waveguides such as used in direction and range finding, and detection systems.

Attenuating devices of certain types including that herein dealt with have electrode posts extending into a waveguide section and capable of being contacted manually or by remote control whenever it is desirable to prevent essentially all or part of the signal wave energy from traversing that section. The tips of such shutter posts or pins and their supports are subject to wear and alignment deviation which are detrimental to proper performance.

Objects of the invention are to provide a shutter structure which avoids deviations from their correct placement within the waveguide, and of deterioration of the shutter tip configuration during repeated operation, to provide a bearing surface for a shutter tip which always remains perpendicular to the shutter axis, to provide such a construction which separates portions which are subject to mechanical wear from electrically effective portions thus minimizing frequency shift due to disfiguration of the shutter tips during repeated operation, to provide for mutual guidance of two complemental apex portions while excluding detrimental effects of surfaces which come into wearing mechanical contact, upon the electrical properties of the device, at the same time avoiding detrimental friction.

A brief summary of the invention serving to indicate its nature and substance in its principal aspects for attaining the above objects is as follows.

Shutter devices incorporating the invention comprise a conical shutter post extending from a wall portion of the waveguide and provided with an end portion that has a transverse shoulder and a cylindrical tip portion extending from the shoulder and terminating in a somewhat pointed apex portion, a hollow shutter post holder extending from a wall portion opposite to the first wall portion coaxially with the conical shutter post, and within the bore of the hollow shutter post holder an axially movable shutter post or pin having a transverse tip face and a cylindrical recess which is axially aligned with and slidingly fits the cylindrical tip portion of the conical shutter post.

In a preferred embodiment the conical shutter post is longitudinally adjustable on its guide wall whereas the hollow shutter post holder is permanently fixed. The conical end portion and the conical apex of the shutter post preferably belong to the same cone surface, and the apex is flattened perpendicular to the axis. The axially movable shutter post or pin is preferably cylindrical and has a diameter slightly larger than the transverse shoulder of the opposite adjustably fixed conical shutter post and its cylindrical recess is slightly wider and longer than the cylindrical tip portion of the latter.

These and other objects and aspects of the invention will appear from the following detailed description of a practical embodiment illustrating its novel characteristics.

The description refers to a drawing in which

Figure 1:
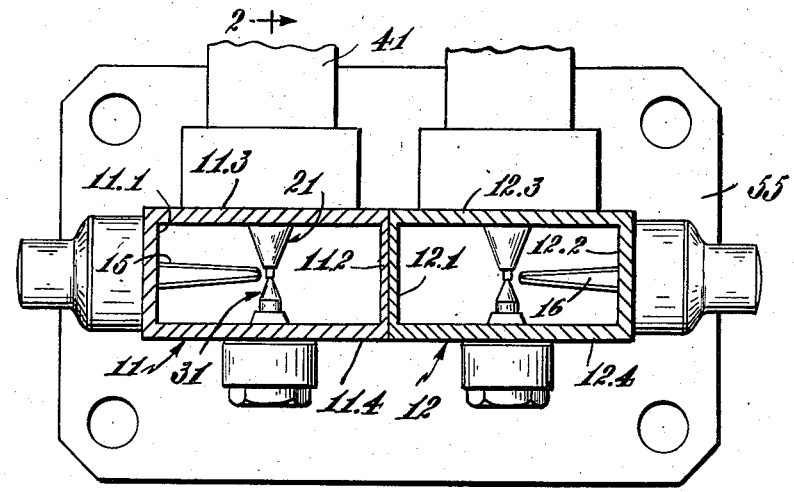
Fig. 1 is a longitudinal section through a TR tube of known construction, Fig. 1 being a section on lines 1—1 of Fig. 2.
Figure 2:
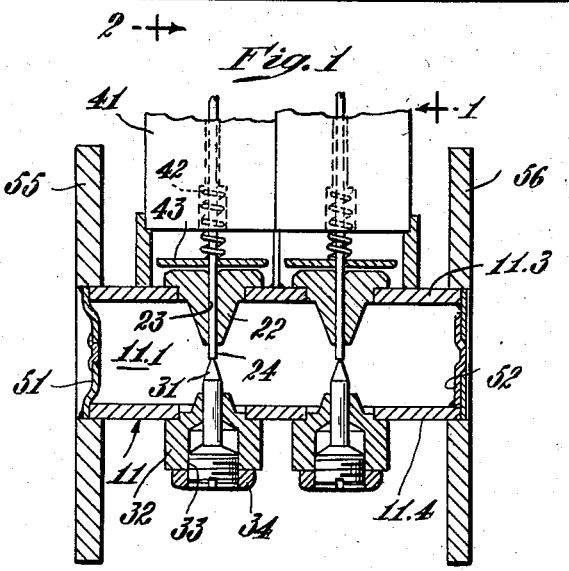
Fig. 2 is a section on lines 2—2 of Fig. 1.

In Figs. 1 and 2, a conventional dual transmit-receive tube (commonly referred to as TR tube) is shown as embodying the shutter structure according to the invention. In these figures, numerals 11 and 12 indicate waveguide sections which are mounted with their inner narrower walls 11.2 and 12.1 touching each other, whereas the outer narrower walls 11.1 and 12.2 carry conventional ignition equipment indicated at 15 and 16. The wider walls on one side of the waveguides, indicated at 11.3 and 12.3, and the opposite wider walls 11.4 and 12.4 on the other side carry pairs of conical electrodes which for present purposes are represented by the pair of posts numbered 21 and 31, respectively. These provide discharge gaps serving purposes well-known in this art.

As indicated in Fig. 2, one of a pair of discharge gap electrodes according to the invention comprises a frustoconical metallic body 22 constituting a shutter electrode or fixed shutter post holder and having an axial bore hole 23 defining an annular tip 29. A shutter post or pin 24 is slidably guided in the hole 23 and can be controllably moved by means suitable for that purpose and not part of the present invention. Such means may be confined above the holders 21, as indicated at 41, and they may be constructed to counteract the force exerted by mechanical biasing means such as indicated by a spring 42. A disc 43, fastened to the post 24 limits the movement of the latter.

The second gap electrode 31 constituting a fixed shutter post or cone is in conventional manner mounted in a socket 32 relatively to which it is adjustable by means of a threaded portion 33 and a stop nut 34.

The shutter post holder 22 and the socket 32 are in conventional manner, such as by brazing, fastened to the walls 11.3 and 11.4 respectively.

As indicated in Fig. 2, the waveguide portions 11 and 12 are on either side closed by a dielectric window, conventional constructions being indicated at 51 and 52. Flanges 55 and 56 are provided for mounting the unit in the system within which it operates.

Figure 3:
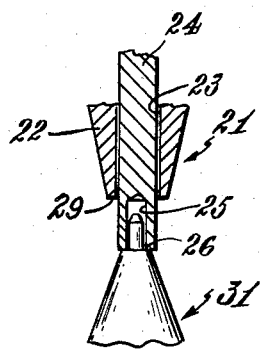
Figs. 3 and 4 are fragmentary elevations with the shutter post holder and its shutter post in section and with the adjustable shutter cone in elevation, Fig. 3 showing these components in contact and Fig. 4 showing them separated.
Figure 4:
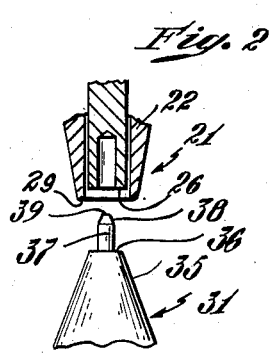

The substance of the present invention is particularly illustrated in Figs. 3 and 4. In these figures the shutter post 24 of the electrode 21 is shown as having a cylindrical recess 25 and a transverse end or bearing surface 26 perpendicular to the longitudinal axis of the gap system.

The companion electrode 31 has a conical base 35 terminating in a transverse flat shoulder or counterbearing surface 36 which matches the surface 26 and from which extends a cylindrical guide tip portion 37 that ends in a conical end portion 38 which is transversely flattened as indicated at 39. The diameter of shoulder 36 is slightly greater than that of post 24.

The recess 25 of the post 24 is longer than the cylindrical tip portion 37 together with the conical end portion 38, and the diameter of the cylindrical tip portion 37 is slightly smaller than that of the recess 25 of the shutter post.

In operation, it was found that open gaps of the type illustrated in Fig. 4 operate successfully in devices of the type above indicated and that, upon closing such gaps by moving the shutter post 24 downwardly until the bearing face 26 contacts the bearing face 36 as shown in Fig. 3, short circuiting is accomplished without encountering any detrimental, frictional or other, effect. Wear is removed from the tips of the electrodes and can take place only at the matching bearing surfaces 26 and 36, so that frequency shift due to cone disfiguring during the up and down operation is greatly minimized. In other words, wear due to repeated impact between the two electrodes is effectively removed from points where it has a detrimental effect on the electrical operation, and placed where it can do no harm in this respect. Lateral binding is minimized by the clearance between the cylindrical surfaces 25 and 37, allowing for possible non-concentricity of the movable shutter post 24 and the fixed cone 31. It will now be evident that such slight eccentricities are taken care of by the upper pointed part 38 of the electrode 31 which guides the shutter post 24 into satisfactory contact at the transverse bearing surfaces 26 and 36.

It should be understood that the present disclosure is for the purpose of illustration only and that this invention includes all modifications and equivalents which fall within the scope of the appended claims.

I claim:

1. A shutter gap device for electromagnetic waveguides comprising: first electrode means having a cylindrical tip portion arising from a transverse bearing surface; second electrode means in substantial axial alignment with the first electrode means, having an axial recess which fits said cylindrical tip portion with some play, and terminating in a transverse bearing surface substantially matching said first bearing surface; and means for mounting said electrode means with movement relatively to each other in axial direction; said recess being somewhat longer than said tip portion such that upon closing of the gap with said movement mechanical contact takes place at said bearing surfaces and not at said tip portion, and eccentricity between the two electrodes is taken up by said play.

2. A shutter gap device for electromagnetic waveguides comprising: an electrode extending from a wall portion of the waveguide and having a frusto-conical tip base portion with a cylindrical stud portion extending from a transverse shoulder at the root of the cylindrical portion; a shutter electrode extending from a wall portion opposite said first wall portion and having an axial bore forming an annular rim tip; and within said bore of said shutter electrode an axially movable shutter post having a transverse tip face fitting said shoulder and a cylindrical recess which is in essentially axial alignment with and slidingly fits said cylindrical stud portion of said first electrode and is deeper than the height of said cylindrical portion; whereby high frequency short circuit can be with certainty established at the transverse shoulder and tip face upon inserting said stud portion into said recess, the tip of said stud portion and said rim tip are protected against wear likely to cause frequency shift, and binding of the tip portion and recess is minimized.

3. A shutter gap device for electromagnetic waveguides comprising: an adjustably fixed shutter post extending from a wall portion of said waveguide and having a frusto-conical end portion with a perpendicularly transverse flat bearing surface at its end, a cylindrical tip portion extending therefrom, and a conical guide portion at the apex of said tip portion; a frusto-conical shutter post holder extending from a wall portion opposite to said first wall portion substantially coaxial with said shutter post and having an axial bore forming an annular rim tip; and within said bore of said post holder an axially movable shutter post having a flat perpendicularly transverse bearing surface, and at its tip a cylindrical recess which is axially substantially aligned with and slidingly fits said cylindrical tip portion of said fixed post and which is deeper than said tip portion; whereby high frequency short circuit can be with certainty established at the transverse bearing surfaces, the conical guide portion is protected against wear causing frequency shift, and binding and wear of the tip portions is minimized.

References Cited in the file of this patent

UNITED STATES PATENTS 2,801,392    Booth _____ July 30, 1957